United States Patent

McMurtry

[11] Patent Number: 5,074,052
[45] Date of Patent: Dec. 24, 1991

[54] CONTACT-SENSING PROBE

[75] Inventor: David R. McMurtry, Wotton-Under-Edge, United Kingdom

[73] Assignee: Renishaw plc, Gloucestershire, United Kingdom

[21] Appl. No.: 602,927

[22] PCT Filed: Dec. 9, 1987

[86] PCT No.: PCT/GB87/00890
§ 371 Date: Jul. 25, 1988
§ 102(e) Date: Jul. 25, 1988

[87] PCT Pub. No.: WO88/04401
PCT Pub. Date: Jun. 16, 1988

Related U.S. Application Data

[63] Continuation of Ser. No. 223,789, Jul. 25, 1988, abandoned.

[30] Foreign Application Priority Data

Dec. 9, 1986 [GB] United Kingdom ................. 8629437

[51] Int. Cl.⁵ .............................................. G01B 7/00
[52] U.S. Cl. ........................................ 33/559; 33/556
[58] Field of Search ................. 33/556, 558, 559, 561, 33/503, 832

[56] References Cited

U.S. PATENT DOCUMENTS 4,279,080 7/1981 Nakaya ................................. 33/561
4,523,382 6/1985 Werner et al. .

FOREIGN PATENT DOCUMENTS 169416 1/1986 European Pat. Off. .
3506892 9/1986 Fed. Rep. of Germany ........ 33/558

Primary Examiner—William A. Cuchlinski, Jr.
Assistant Examiner—Alvin Wirthlin
Attorney, Agent, or Firm—Oliff & Berridge

[57] ABSTRACT

A contact-sensing probe for use in co-ordinate measuring machines has a housing (10) intended to be supported by the machine and a plate (11) supporting a stylus (12) intended to engage a workpiece (15) to be measured. The plate (11) is connected to the housing (10) by a first set of three wires (14A) extending obliquely upward from the plate (11) and a second set of three wires (14B) extending obliquely downwards from the plate (11). The wires (14A, 14B), which are flexible, are placed into tension by torque applied to the plate (11) by a torsion spring (18). This establishes a rest position for the stylus (12). Displacement of the stylus (12) from the rest position, due to engagement with the workpiece (15), is accommodated by buckling of the wires (14A and/or 14B). The stylus (12) is displaceable in the sense of being tilted in any plane containing the axis (10A) of the housing (10), and the arrangement of wires (11) enables displacement in either sense of the direction of the axis (10A). In a modification the wires (14A, 14B) are replaced by compressively rigid rods.

31 Claims, 3 Drawing Sheets

CONTACT-SENSING PROBE

This is a continuation of application Ser. No. 07/223,789 filed July 25, 1988 now abandoned.

This invention relates to a contact-sensing probe. The scope of the invention is specified in the claims hereto. By virtue of the axially proximate relationship of one ends of elongate support elements and the axially remote relationship of other ends of the elongate support elements, a second member is supported on a first member in a manner making it possible not only to tilt the second member in any plane containing the axis of the first member but also to displace the movable member in either axial sense.

Two embodiments of a probe according to this invention will now be described with reference to the accompanying drawings wherein.

Figure 1:
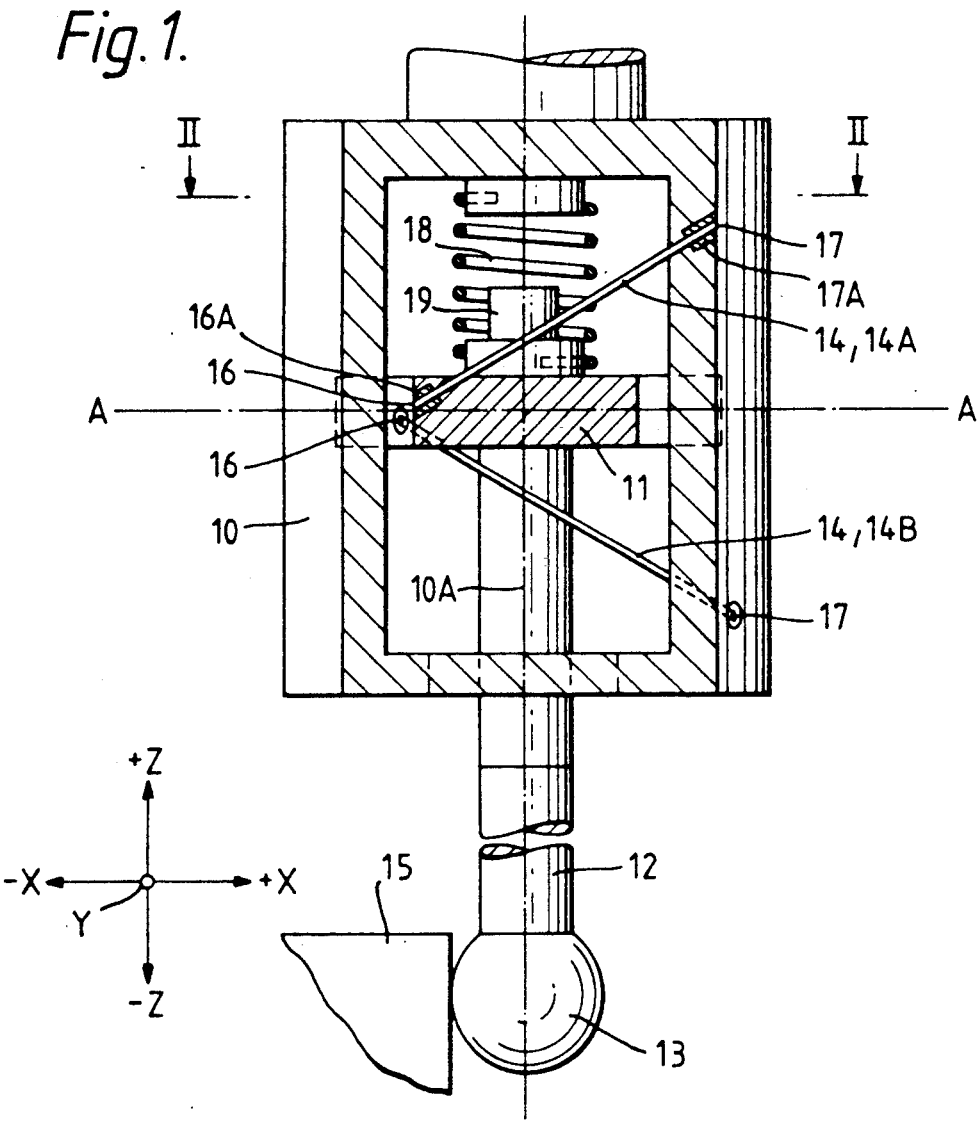
FIGS. 1 and 2 are respectively an elevation and plan view of the first embodiment, FIG. 1 being a section on the line I—I in FIG. 2 and FIG. 2 being a section on the line II—II in FIG. 1.
Figure 2:
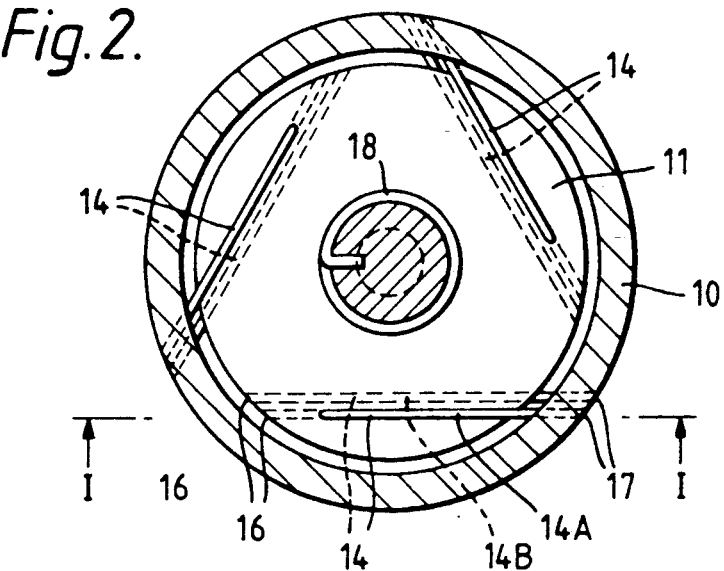

Referring to FIGS. 1 and 2, the probe has a housing 10, having an axis 10A. A two-dimensional structure or disc-shaped plate 11 is situated within the housing and extends in a plane A—A transverse to the axis 10A. A stylus 12 secured to the plate 11 extends from the housing 10 along the axis 10A. The housing 10 is adapted to be secured to a coordinate measuring machine operable to bring the free end, 13, of the stylus into engagement with a workpiece 15 with a view to measuring the position thereof as known per se.

The plate 11 is supported in the housing by two sets of flexible wires 14 which are flexible in compression but rigid (non-yieldable) in tension and which are situated in an equispaced arrangement around the axis 10A. Each wire has an end 16 secured to the plate 11 by a lug 16A and an end 17 secured to the housing 10 by a lug 17A. The one set comprises three first wires 14A extending obliquely upwards from the plane A—A and a set of three second wires 14B extending obliquely downwards from the plane A—A. For clarity only one wire of each set is shown in FIG. 1. A torsion spring 18 connected between the housing 10 and the plate 11 is adapted to apply torque to the plate 11 about the axis 10A such that the wires are placed into tension thereby establishing a firm connection between the members 10,11 and holding the stylus 12 in a stable rest position relative to the housing 10.

Displacement of the stylus 12 from the rest position, as by said engagement with the workpiece 13, is accommodated by the buckling of the wires and in opposition to the force of the spring 18. It will be clear that the stylus 12 is supported by the wires 14 in a manner permitting tilting of the stylus in any plane containing the axis 10A and permitting movement in either sense of the direction of the axis 10A.

Referring to the wires 14A, 14B shown in FIG. 1, displacement of the stylus end 13 in the direction +X or −Z is accommodated by buckling of the wires 14B. Displacement of the stylus 12 in the direction −X or +Z is accommodated by buckling of the wires 14A.

Generally, the plate 11, and thus the stylus 12, is displacable angularly, i.e. is tiltable, in any plane containing the axis 10A and is displacable linearly in either sense of the direction of the axis 10A. In each case, the spring 18 restores the stylus to the rest position when the displacing force ceases. Each flexible wire constitutes a lost-motion device.

FIGS. 1 and 2 show that the ends 16 of the wires 14A have substantially the same angular position about the axis 10A as the ends 16 of the wires 14B, the ends 17 being positioned correspondingly. In a modification (not illustrated) the wires 14A are staggered with respect to the wires 14B so that the end 16 of any wire 14A lies intermediate between the ends 16 of the other two of the wires 14B, the ends 17 being similarly staggered.

Figure 3:
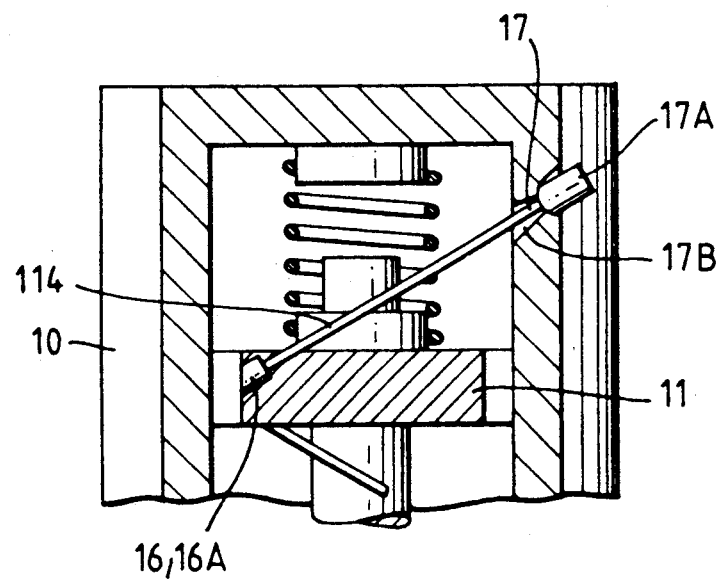
FIG. 3 is a fragmentary view of FIG. 1 and shows a modification.

An alternative form of lost-motion is shown in FIG. 3 where the wires, here denoted 114, are each made of resilient material relatively stiff in bending. The end 16 of the wire 114 is secured to the plate 11. The end 17 of the wire 114 is slidable in and projects through a bore 17B in the wall of the housing 11. The projecting portion has secured thereto the lug 17A. In the absence of a displacing force on the stylus, the lug 17B abuts the outside of the housing 11 under the force of the spring 18. Displacement of the stylus is accommodated by the end 17 sliding through the bore 17B.

Figure 4:
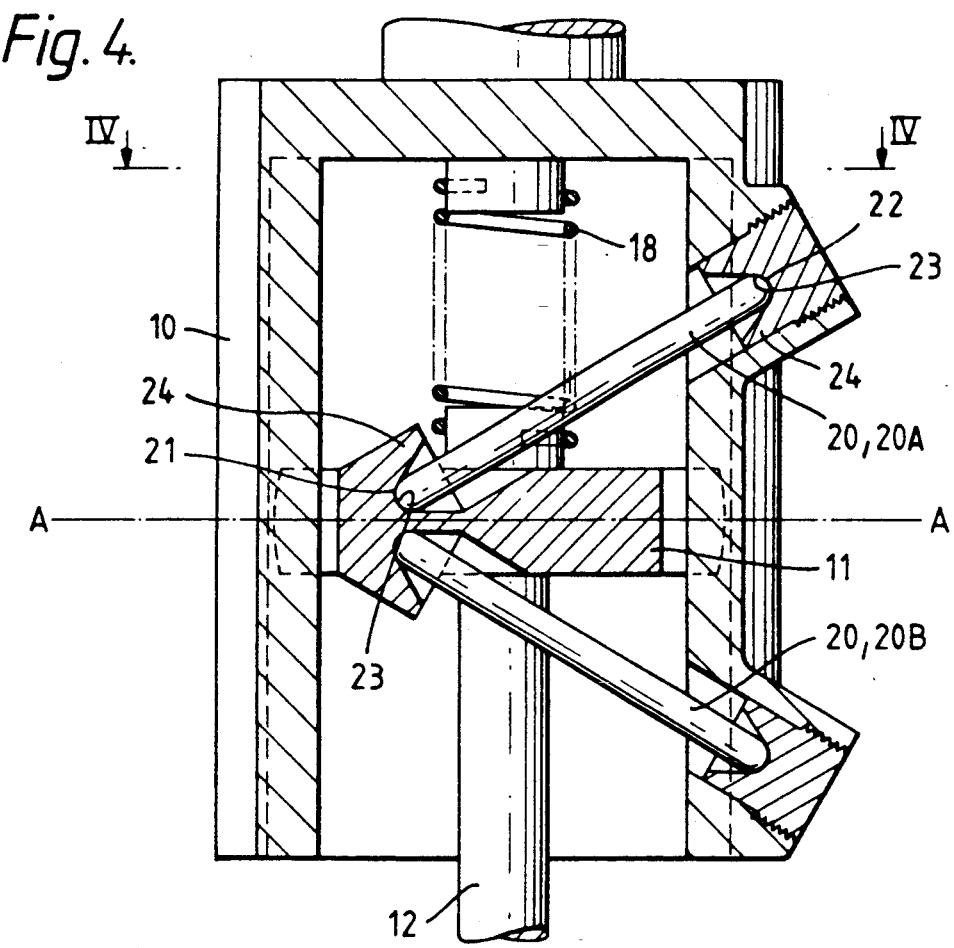
FIGS. 4 and 5 are respectively an elevation and a plan view of the second embodiment, FIG. 4 being a section on the line III—III in FIG. 5 and FIG. 5 being a section on the line IV—IV in FIG. 4.
Figure 5:
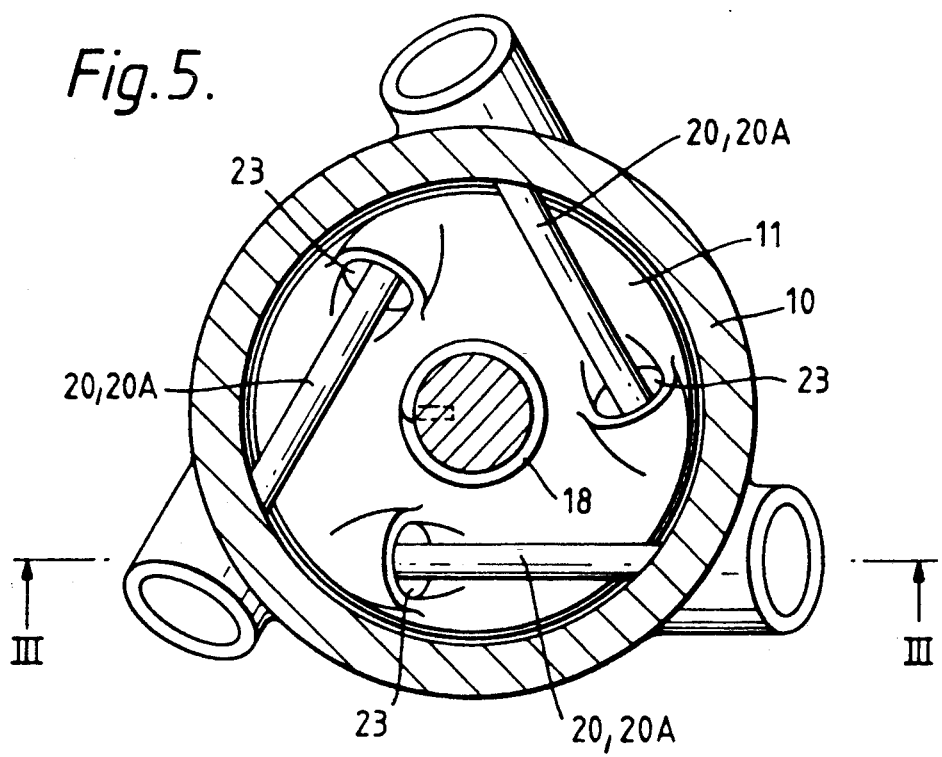

The example shown in FIGS. 4 and 5 is the same as that shown in FIGS. 1 and 2 except that the wires are replaced by rods 20A,20B which are rigid (non-yieldable) in compression and each of which have an end 21 pivoted to the plate 11 and an end 22 pivoted to the housing 10. The pivots are constituted by universal thrust bearings or cups 23 provided on the plate 11 and on the housing 10 and into which the rod ends 21,22, which are part-spherical, are urged by the torsion spring 18. The action of the spring 18 places the rods 20 into compression thereby holding the stylus 12 in a stable rest position relative to the housing 10. Any displacement of the stylus 12 from the rest position results in the ends 22,23, or at least some of these ends, being moved out of their respective cups 23. The displacement takes place in opposition to the spring 18. The latter cooperates to return rod ends to their cups, thus returning the stylus to the rest position when the displacing force ceases. Each cup 23 is provided with a shroud 24 which guides the respective end 21 or 22 back into the cup 23 when the stylus resumes the rest position. The arrangement whereby the rods can withdraw from the cups 23 constitutes a lost-motion device.

Figure 6:
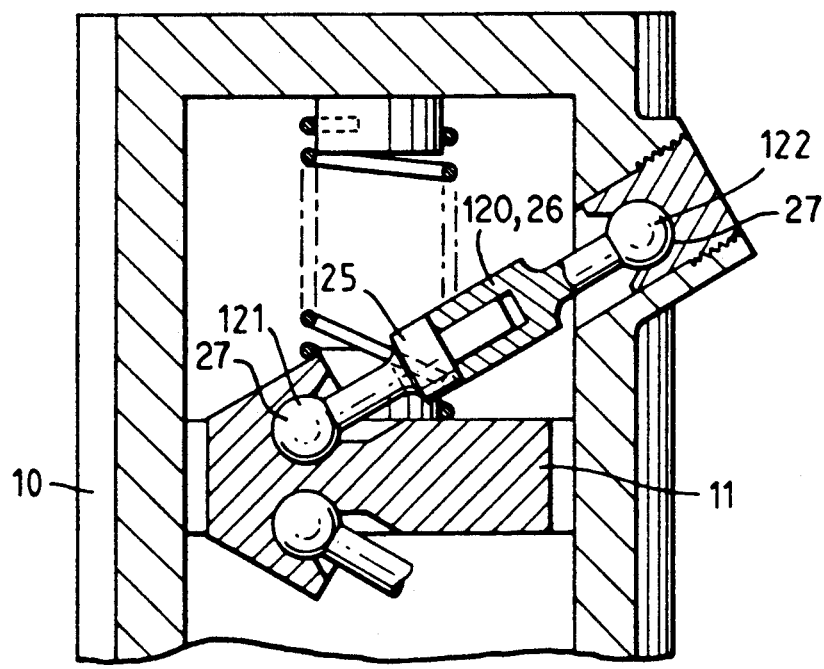
FIG. 6 is a fragmentary view of FIG. 4 and shows a modification.

In a modification (FIG. 6) a lost-motion device is constructed in that each rod, here denoted 120, is made in two parts 25,26 one slideable on the other in the direction of the length of the rod. The ends 121,122 of the rod are universally pivotally connected to the members 10,11 by ball and socket devices 27. In the absence of a displacing force on the stylus the parts 25,26 abut under the compressive force on the rod. Displacement of the stylus is accommodated by separation of the parts 25,26.

In each of the examples the torsion spring 18 may be replaced by tension or compression springs connected between the plate 11 and the housing 10 along axes lying in the plane A—A and arranged so as to place the wires 14,114 into tension or place the rods 20,120 into compression, as the case may be, in this way to urge the stylus 12 into the rest position.

Inasmuch as the housing 10 is intended to be secured to said machine it may be said to define a fixed member and inasmuch as the plate 11 is movable relative to the housing 10 it may be said to define a movable member.

It will be clear that the wires 14,114 and the rods 20,120 respectively constitute elongate support elements connected between the plate 11 and the housing 10 in a manner so that at least one of the support elements is oblique to the axis 10A, and that the spring 18 is a bias means resiliently applying tension to the wires 14,114 or compression to the rods 20,120. Alternatively, the disposition of the elements 14,114 or 20,120 may be defined by the relationship of their ends by saying that the elements, e.g. 14A,14B have ends 16 which are axially proximate (i.e. proximate in the direction of the axis 10A) and have ends 17 which are axially remote. Similarly, the elements, e.g. 20A,20B have axially proximate ends 21 and axially remote ends.

The geometry of the arrangements in FIGS. 1,2 or 4,5 is such that in each set of three support elements 14 or 20, the three support elements may be said to lie at least approximately at the respective sides of a notional triangular prism centred on the axis 10A (FIGS. 2,5) and any one element of the set may be said to extend obliquely to the axis 10A (FIGS. 1,4) in the same sense as the other elements. For example, each element extends from its end on the plate 11 obliquely upwards and to the right. As a result, torque applied between the members 10,11 as by the spring 18 tends to apply to each element of the set a similarly directed force, either tensile or compressive, as the case may be.

Engagement of the stylus 12 with the workpiece 15 may be signalled by any known means. A preferred such means is a piezo-electric element 19 mounted on the plate (11) as shown in FIG. 1. The element 19 senses the engagement with the workpiece by responding to the shock wave passing through the stylus upon such engagement.

I claim:

1. A touch probe for sensing contact between a stylus and a workpiece comprising:
   a housing;
   stylus holding means provided within the housing for supporting the stylus;
   a plurality of first support assemblies, each having a first elongate support element, and first means for engaging one end of the first elongate support element with the stylus holding means, and the other end of the first elongate support element with the housing;
   a plurality of second support assemblies, each having a second elongate support element, and second means for engaging one end of the second elongate support element with the stylus holding means, and the other end of the second elongate support element with the housing;
   biasing means, for causing the first support assemblies to urge the stylus holding means translationally in a first direction, and causing the second support assemblies to urge the stylus holding means translationally in a direction opposite to the first direction, thereby counteracting the action on the first elongate support elements and retaining the stylus holding means in a rest position;
   wherein the first and second support assemblies are non-yieldable to force acting between the housing and the stylus holding means in one direction of the length of the first and second elongate support elements, and are yieldable to force acting between the stylus holding means and the housing in the other direction of the length of the first and second elongate support elements.

2. A touch probe according to claim 1 wherein the stylus has an axis, the stylus holding means comprises a member connected to the stylus and having a reference plane transverse to the axis, the first elongate support elements extend from the member to the housing on one side of the reference plane, and the second elongate support elements extend from the member to the housing on the other side of the reference plane.

3. A touch probe according to claim 2 wherein the first and second elongate support elements each extend from the member obliquely to the reference plane.

4. A touch probe according to claim 3 wherein the biasing means acts to rotate the member about the axis.

5. A touch probe according to claim 4 wherein the elongate support elements are non-yieldable in tension and yieldable in compression.

6. A touch probe according to claim 4 wherein the elongate support elements are non-yieldable in compression and yieldable in tension.

7. A touch probe according to claim 4 wherein the elongate support elements are non-yieldable in bending.

8. A touch probe according to claim 2 wherein the biasing means acts to rotate the member about the axis.

9. A touch probe according to claim 8 wherein the elongate support elements are non-yieldable in tension and yieldable in compression.

10. A touch probe according to claim 8 wherein the elongate support elements are non-yieldable in compression and yieldable in tension.

11. A touch probe according to claim 8 wherein the elongate support elements are non-yieldable in bending.

12. A touch probe according to claim 1 wherein the first support assemblies and second support assemblies respectively cooperate to be rigid to a force substantially equal in magnitude to the biasing force and acting between the housing and the stylus holding means in one direction of the length of the respective first and second elongate support elements, and cooperating to be simultaneously yieldable to force acting between the stylus holding means and the housing in the other direction of the length of the respective first and second elongate support elements.

13. A contact sensing probe, comprising:
    a first member having an axis;
    a second member translationally displaceable parallel to the axis, to which a stylus is securable, the second member defining a reference plane orthogonal to the axis;
    a plurality of first elongate supports engaged at one end with the first member and at the other end with the second member, and extending from the first to the second member on one side of the reference plane;
    a plurality of second elongate supports engaged at one end with the first member and at the other end with the second member, and extending from the first to the second member on the other side of the reference plane;
    the first and second supports permitting relative displacement between the first and second members in one direction of their length, and being non-yieldable to force acting between the first and second members in the other direction of their length; and biasing means for biasing the first member against the supports in the other direction of their length.

14. A contact-sensing probe, comprising:
a housing having an axis;
a single plate situated within the housing and extending in a transverse plane to said first axis;
a stylus securable to said single plate;
first elongate support means extending obliquely away from the transverse plane on one side thereof and having a first end engaged to said single plate and a second end engaged to said housing;
second elongate support means extending obliquely away from the transverse plane on the other side thereof and having a first end engaged to said single plate and a second end engaged to said housing; and
biasing means connected between said housing and said single plate.

15. A probe according to claim 14, wherein:
the first end of said first elongate support means and the first end of said second elongate support means are proximate in the direction of said axis.

16. A probe according to claim 15, wherein:
the second end of said first elongate support means and the second end of said second elongate support means are remote in the direction of said axis.

17. A probe according to claim 14, wherein:
said first and second elongate support means consist of a plurality of wires which are non-yieldable in tension.

18. A probe according to claim 17, wherein:
the biasing means is adapted to apply torque to said plate about said axis such that the plurality of wires are placed into tension thereby establishing a firm connection between said housing and said plate and holding the stylus in a stable rest position.

19. A probe according to claim 14, wherein:
said first elongate support means consists of a first rod and said second elongate support means consists of a second rod;
said first and second rods being pivotably engaged to both said housing and said plate, and being non-yieldable in compression.

20. A probe according to claim 19, wherein:
the biasing means is adapted to apply torque to said plate about said axis and the first and second rods are placed into tension thereby establishing a firm connection between said housing and said plate and holding the stylus in a stable rest position.

21. A probe according to claim 14, wherein:
said first elongate support means consists of a first rod and said second elongate support means consists of a second rod;
said first and second rods being pivotally connected to both said housing and said plate;
said first and second rods being made of two parts which are supported one on the other for motion in the direction of the length of the respective rods to thereby release their connection.

22. A probe according to claim 14, wherein:
said housing is provided with a plurality of bores;
said plurality of bores providing relative motion between said first elongate support means and at least one member consisting of said housing and said plate when the plate is displaced from a rest position.

23. A probe according to claim 14, wherein:
said first elongate support means consists of three rods extended at least approximately at the respective sides of a rotional triangular prism centered on said axis.

24. A probe according to claim 14, wherein said biasing means is a spring.

25. A contact-sensing probe, comprising:
a housing having an axis;
a plate situated within the housing and extending in a transverse plane to said first axis;
a stylus securable to said plate;
first elongate support means having a first end connected to said plate and a second end connected to said housing;
second elongate support means having a first end connected to said plate and a second end connected to said housing; and
a torsion spring connected between said housing and said plate.

26. A probe according to claim 25, wherein said first elongate support means extends obliquely away from said transverse plane on one side thereof and said second elongate support means extends obliquely away from said transverse plane on a second side thereof.

27. A touch probe for sensing contact between a stylus and a workpiece comprising:
a housing;
stylus holding means provided within the housing for supporting the stylus;
a plurality of first support assemblies, each having a first elongate rod, and first means for engaging one end of the first elongate rod with the stylus holding means, and the other end of the first elongate rod with the housing;
a plurality of second support assemblies, each having a second elongate rod, and second means for engaging one end of the second elongate rod with the stylus holding means, and the other end of the second elongate rod with the housing;
biasing means, for causing the first support assemblies to urge the stylus holding means translationally in a first direction, and causing the second support assemblies to urge the stylus holding means translationally in a direction opposite to the first direction, thereby counteracting the action on the first elongate rods and retaining the stylus holding means in a rest position;
wherein the first and second support assemblies are non-yieldable to force acting between the housing and the stylus holding means in one direction of the length of the first and second elongate rods, and are yieldable to force acting between the stylus holding means and the housing in the other direction of the length of the first and second elongate rods.

28. A touch probe according to claim 27 wherein each of the first and second engaging means provides pivotal support for the first and second elongate rods at the ends thereof to enable pivoting of the first and second rods relative to the stylus holding means and the housing.

29. A touch probe according to claim 28 wherein the stylus holding means defines an axis and a reference plane transverse to the axis, the first elongate rods extend from the stylus holding means to the housing on one side of the reference plane, and the second elongate rods extend from the stylus holding means to the housing on the other side of the reference plane.

30. A touch probe according to claim 29 wherein each of the first and second elongate rods extends from the stylus holding means obliquely to the reference plane.

31. A touch probe according to claim 29 wherein the biasing means acts to rotate the stylus holding means about the axis.

* * * * *